June 29, 1965 R. R. BENNETT 3,191,591
CHARCOAL GRILL

Filed March 7, 1963 2 Sheets-Sheet 1

INVENTOR.
RICHARD R. BENNETT
BY Wood, Gust & Irish
ATTORNEYS

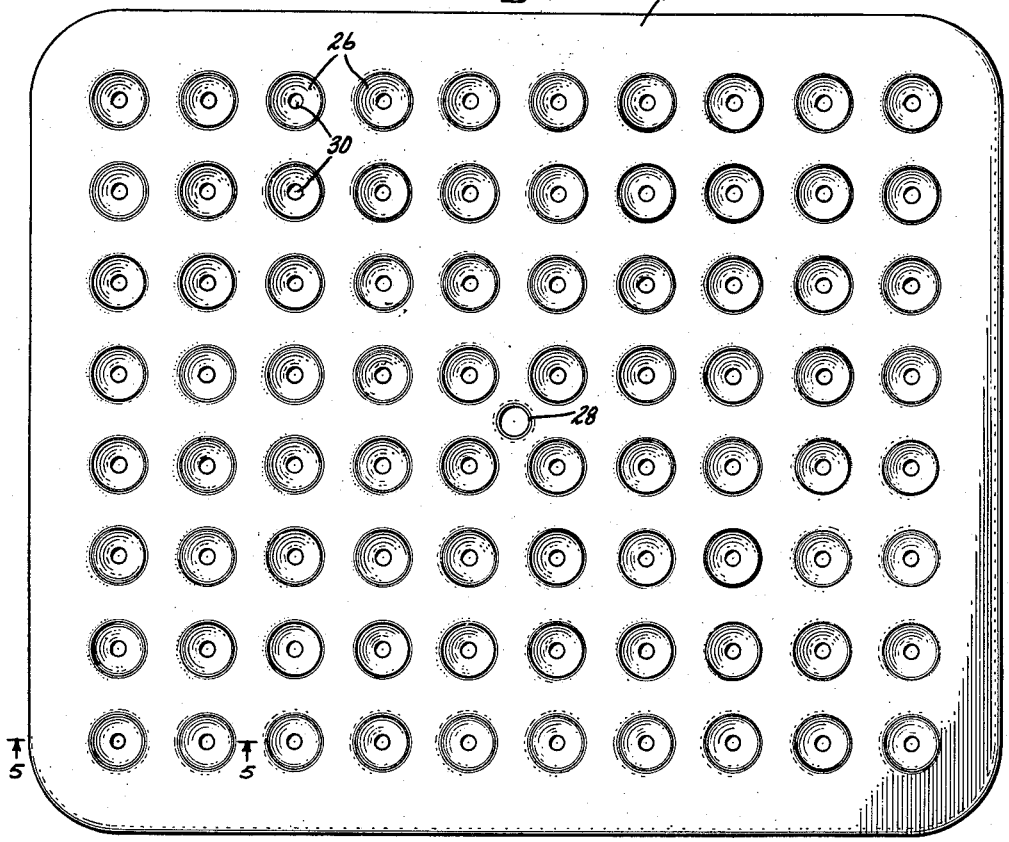
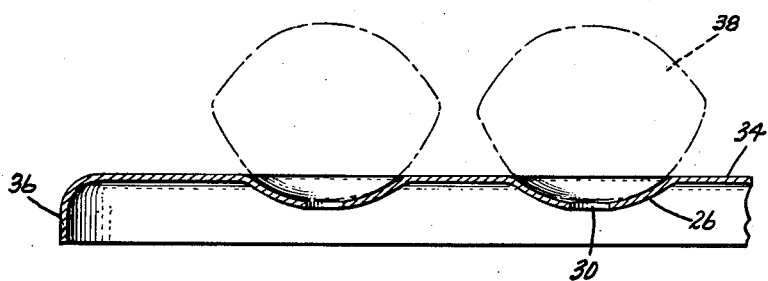

United States Patent Office 3,191,591
Patented June 29, 1965

3,191,591
CHARCOAL GRILL
Richard R. Bennett, R.R. 4, Ferguson Road,
Fort Wayne, Ind.
Filed Mar. 7, 1963, Ser. No. 264,480
3 Claims. (Cl. 126—25)

The present invention relates to a charcoal grill, and more particularly to a unique structure for supporting charcoal while it is burning. This application is a continuation-in-part of application Serial No. 153,168, filed November 17, 1961, now abandoned.

Conventional charcoal grills comprise a receptacle in which charcoal is contained and burned. Ordinarily, the charcoal is merely poured into the receptacle, and the pieces of charcoal are permitted to pile one on top of the other. In these random positions, the charcoal is ignited and allowed to burn or glow. Some of the pieces of charcoal are spaced apart while still others rest in small piles, the total quantity of pieces being randomly dispersed over the bottom of the receptacle. While these pieces burn, they produce heat in accordance with the distribution thereof, the piles of charcoal producing a more intense heat than the pieces which are spaced apart. This results in an uneven area of heat being produced over the surface of the charcoal bed such that when several different items of food are being roasted on the grill, some of the items receive more heat than others. This results in some of the items being more thoroughly roasted than others.

It is therefore an object of this invention to provide a charcoal grill which is capable of producing an even or a uniform area of heat whereby a number of items on the grill will be uniformly roasted.

It is another object of this invention to provide a charcoal grill which requires less charcoal for forming a heat bed than prior art grills.

It is still another object of this invention to provide a charcoal grill wherein an even or uniform layer of heat can be produced through the use of less charcoal than was previously possible.

Other objects of this invention will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 4 is a top plan view of the charcoal supporting plate in accordance with another embodiment of the invention; and FIG. 5 is a cross-sectional view drawn to scale as to the briquette and indentation taken along the lines 5—5 of FIG. 4.

Figure 1:
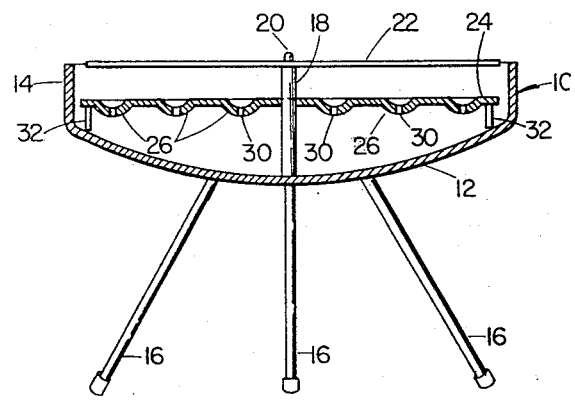
FIG. 1 is a vertical sectional illustration of one embodiment of this invention.

Referring to the drawings, a bowl-shaped support or receptacle generally indicated by the reference numeral 10 is provided with a curved bottom 12 and a peripheral, upstanding side 14. The receptacle 10 is supported above a surface by means of three legs 16 spaced apart to form a tripod.

Secured to the central portion of the bottom 12 and upstanding therefrom is a supporting post 18 having a reduced diameter tip 20 on the upper end thereof which receives an ordinary wire-mesh grill 22.

Figure 2:
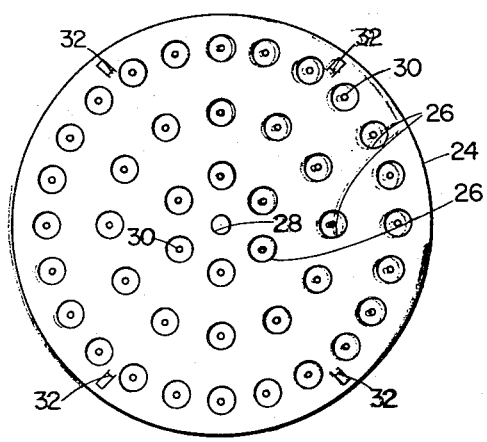
FIG. 2 is a top plan view of the charcoal supporting plate of FIG. 1.
Figure 3:
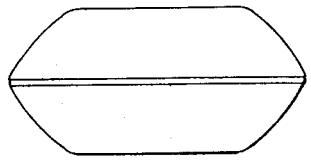
FIG. 3 is a side view of a typical piece or briquette of charcoal suitable for use with the grill of FIGS. 1 and 2.

Fitted over the center post 18 and resting on the bottom 12 is a charcoal-supporting plate 24 which preferably is stamped out of sheet metal. This plate 24 is of substantially the same size as the area of the bottom 12 and is circular in the preferred embodiment as illustrated in FIG. 2. However, it will be understood by a person skilled in the art that the plate 24 may be rectangular, square or of still different shapes as may be desired.

The plate 24 is provided with a plurality of cup-shaped indentations 26 which are spaced apart both circumferentially and radially with respect to the center opening 28 which loosely fits over the supporting post 18. There may be any number of these cup-shaped indentations 26, depending upon the size and shape of the grill and also upon design requirements. Of importance is the fact that spaces or lands are provided between indentations 26 and the indentations are symmetrically arranged with respect to the center 28 and also with respect to one or more diameters drawn through the center. The significance of this latter feature will be explained more fully hereinafter.

Each indentation is provided with an aperture 30.

A number of supporting legs are provided on plate 24 and in the illustrated embodiment four such legs 32 are shown, these legs being struck downwardly from the plate 24 as shown more clearly in FIG. 1. The legs 32 engage the bottom 12 of the receptacle 10 and thereby space the plate 24 above the bottom 12 in a horizontal plane.

In use, the plate 24 is positioned in place and the grill 22 is temporarily removed. A quantity of charcoal pieces or briquettes are poured onto the plate 24, and the grill is vibrated or gently shaken enough to cause the charcoal pieces to distribute themselves in the various indentations 26. In the alternative, the pieces may be manually placed in the indentations 26. In the preferred operation of the invention, there will be one piece of charcoal for each indentation 26 such that charcoal pieces will be uniformly distributed over the plate 24.

So arranged, the charcoal pieces are ignited and allowed to burn, a portion of the draft for maintaining the burning being provided by the individual apertures 30 in the indentations 26. Once the charcoal has been ignited, the grill 22 is replaced on the supporting tip 20 and the items to be roasted are then placed upon the grill 22. If these items should happen to be meat, a certain amount of grease drippings will fall into the plate 24. If any of these drippings should fall into the indentations 26, they will drain immediately through the apertures 30 and will thereby be prevented from igniting. It is a common difficulty in charcoal grilling for grease drippings to ignite and produce a flame as they drip onto the hot charcoal, thereby causing the meat to burn or to be otherwise damaged. The present invention, while it does not entirely eliminate this difficulty, by providing spaces between pieces of charcoal and also by providing draining apertures 30, materially reduces the tendency for the grease drippings to ignite.

Obviously, since the indentations 26 are evenly distributed over the plate 24, a uniform area of heat is produced. Thus, if several items are distributed over the area of the grill 22, all of these items will be uniformly heated and roasted. This prevents some of the items from being overdone and others underdone, as is true of conventional grills.

In some instances, it is desired to build only a small charcoal fire, in which event it is only necessary to space or position pieces of charcoal on only one side of the plate 24. By doing so, a uniform area of heat for one-half of the plate 24 will be produced. If a smaller area of heat is desired, then only as many indentations 26 are filled with the charcoal pieces.

Referring now to FIGS. 4 and 5 in which like elements are indicated by like reference numerals, there is shown a charcoal-supporting plate 34 of generally rectangular shape for use with charcoal grills of generally rectangular configuration. Plate 34 is preferably formed of relatively thin self-supporting sheet metal and may have a downwardly depending peripheral flange 36 formed thereon, as shown. Center opening 28 is provided through which a supporting post, such as the post 18 of FIG. 1 may extend.

In the illustrated embodiment, indentations 26 are arranged in a recticulate pattern with uniform spacing between adjacent indentations. Reference to FIG. 5 will readily reveal that the indentations 26 are relatively shallow and have a diameter, at the upper surface of the plate 34, substantially less than the maximum transverse dimension of the charcoal briquettes which are respectively seated therein. It is thus seen that each of the indentations 26 will locate and retain only one unburned briquette so that a substantial portion thereof is initially disposed above the upper surface of the plate 34, as shown by the dashed line 38 in FIG. 5. With this proportioning of the indentations 26, it is impossible initially to position more than one unburned briquette of charcoal in each indentation. It will further be observed that the indentations 26 have a curvature generally conforming to the curvature of the peripheral surface of the unburned charcoal briquette 38.

In a specific embodiment of the invention in accordance with FIGS. 4 and 5, indentations 26 have a diameter of 1 3/16 inches at the upper surface of plate 34 and a depth of 3/16 inch, the apertures 30 having a diameter of one-quarter (1/4) inch. In this specific embodiment, the centers of the indentations 26 are spaced two inches apart.

In both of the embodiments of the invention illustrated in FIGS. 2 and 4, the indentations 26 have a diameter substantially smaller than the maximum transverse dimension of the unburned charcoal briquettes in order to locate and retain one and only one briquette with a substantial portion thereof initially disposed above the upper surface of the charcoal-supporting plate. Likewise, the central apertures 30 in the bottoms of the indentations 26 are preferably substantially smaller than the diameter of the indentation in order to prevent a charcoal briquette from falling through the aperture when the briquette has been burned down to a smaller size; however, on the other hand, the apertures 30 cannot be too small in order to prevent the aperture from becoming plugged with grease and ashes. I have found that proper positioning and burning of the individual charcoal briquettes is provided by the indentation 26 having a diameter approximately half the maximum transverse dimension of an individual unburned briquette, and with the central aperture 30 having a diameter approximately one-quarter (1/4) that of the diameter of that of the indentation.

It will be observed in both of the embodiments of FIGS. 2 and 4 that the indentations 26 are arranged in a regular pattern to provide generally the same number of indentations in each unit area of the plate, this in turn to provide a generally uniform distribution of the charcoal briquettes over the area of the plate and in turn uniform heat therefrom. It will be observed, in the embodiment of FIG. 2, that the indentations 26 are disposed on radially spaced circles concentric with the central opening 28, the indentations on each circle being circumferentially evenly spaced, and each successive circle having a greater number of indentations than the next radially inner circle, thereby to provide the above-mentioned uniform distribution.

It will be readily seen that in both embodiments of the invention, controlled heat may be selectively provided, much in the manner of a heating unit of an electric range, by the selective positioning of the individual charcoal briquettes in the indentations 26. Thus, in the embodiment of FIG. 2, if low, but nevertheless uniform heat is desired, individual charcoal briquettes may be positioned in the indentations of the innermost concentric circle; if a higher degree of heat is desired, briquettes may be positioned in the indentations of the innermost and intermediate circles, and if the highest degree of heat is desired, briquettes may be positioned in all of the indentations.

It will readily be seen that by positioning individual briquettes in the individual indentations 26 with a uniform distribution, a much more uniform distribution of heat is obtained with the employment of substantially less charcoal and with consequent improved efficiency. It will further be seen that while the major part of the grease which drips from the meat on the grill 22 will drain through the apertures 30 in the charcoal-supporting plate 24 or 34 into the bottom of the receptacle 12, the major portion of ashes remaining, after the charcoal has been consumed, on the plate. Thus, the plate with the ashes thereon may subsequently be removed for disposal of the ashes.

While the indentations 26 are shown as being circular in configuration, it will be readily understood that they may equally advantageously be square or of any other conveniently formed configuration.

While I have described above the principles of my invention in connection with specific apparatus, it is to be clearly understood that this description is made only by way of example and not as a limitation to the scope of my invention.

What is claimed is:

1. A charcoal grill comprising: an upwardly facing generally cylindrical receptacle having an open upper end, a bottom of extended area, and upstanding sides; an upright supporting post centrally secured to said bottom; a self-supporting substantially flat metallic plate of circular shape having a central opening with said post extending therethrough, said plate having an area substantially equal to that of said bottom, said plate having a plurality of shallow generally cup-shaped downwardly extending indentations formed therein, said indentations being arranged on a plurality of radially spaced circles concentric with said central opening, the indentations on each said circle being circumferentially evenly spaced and each successive one of said circles having a greater number of said indentations thereon than the next radially inner circle thereby to provide a generally uniform distribution of charcoal briquettes over the area of said plate and uniform heat therefrom, each of said indentations having an aperture formed in the bottom thereof, each of said apertures being substantially smaller than the respective indentation; and means for supporting said plate at an elevated position above said bottom.

2. A charcoal grill comprising: an upwardly facing receptacle having an open upper end, a bottom of extended area, and upstanding sides; a self-supporting substantially flat metallic plate having an area substantially equal to that of said bottom, said plate having a plurality of shallow generally cup-shaped downwardly extending indentations formed therein, said indentations being arranged in a pattern with uniform spacing between adjacent indentations thereby being adapted to provide a uniform distribution of charcoal briquettes over the area of said plate and uniform heat therefrom, each of said indentations having an aperture formed in the bottom thereof, each of said apertures being substantially smaller than the respective indentation; and means for supporting said plate at an elevated position above said bottom.

3. A charcoal grill comprising: an upwardly facing receptacle having an open upper end, a bottom of extended area, and upstanding sides; a self-supporting metallic plate having a plurality of shallow generally cup-shaped downwardly extending indentations formed therein, each of said indentations being adapted and proportioned to locate and retain a single unburned charcoal briquette with a substantial portion thereof disposed above the upper surface of said plate, said indentations being arranged in a regular pattern to provide generally the same number of indentations in each unit area of said plate thereby to provide a uniform distribution of the charcoal briquettes over the area of said plate and uniform heat therefrom, each of said indentations having an aperture formed in the bottom thereof, each of said apertures being substantially smaller than the respective indentation; and means for supporting said plate at an elevated position above said bottom.

References Cited by the Examiner
UNITED STATES PATENTS

| | | | |
|---|---|---|---|
| 60,842 | 1/67 | Alexander | 126—152 |
| 1,464,190 | 8/23 | Webster | 126—163 |
| 1,966,945 | 7/34 | Bowers. | |
| 2,630,062 | 3/53 | Litt | 99—440 X |
| 3,060,919 | 10/62 | Shaw | 126—25 |

JAMES W. WESTHAVER, *Primary Examiner.*